United States Patent [19]

Ainsworth

[11] 4,293,975
[45] Oct. 13, 1981

[54] ATTACHMENT FOR WINDSHIELD WIPER BLADES

[76] Inventor: Bobby J. Ainsworth, P.O. Box 182, Achille, Okla. 74720

[21] Appl. No.: 111,534

[22] Filed: Jan. 14, 1980

[51] Int. Cl.³ .............................................. B60S 1/04
[52] U.S. Cl. .................................. 15/250.41; 15/105; 15/111; 15/236 R
[58] Field of Search ....................... 15/250.36–250.42, 15/111, 105, 236 R, 236 B, 236 C

[56] References Cited

U.S. PATENT DOCUMENTS

| | | | |
|---|---|---|---|
| 3,417,421 | 12/1968 | Retke | 15/250.41 |
| 3,631,561 | 1/1972 | Aszkenas | 15/250.41 |
| 3,828,388 | 8/1974 | Fuhr | 15/250.41 |
| 4,136,418 | 1/1979 | Griswold | 15/111 |

Primary Examiner—Peter Feldman
Attorney, Agent, or Firm—Head & Johnson

[57] ABSTRACT

An attachment for windshield wiper blades for vehicles and comprising a body member having an elongated slot or recess provided therein for removably receiving the wiper blade, the outer surface of the body oppositely disposed from the recess being of an arcuate cross sectional configuration whereby the oppositely disposed edges thereof are relatively sharp to provide scraping elements engageable with the outer surface of the windshield, and a transversely extending scraper element provided across the outer end of the body for manual scraping of the windshield.

4 Claims, 7 Drawing Figures

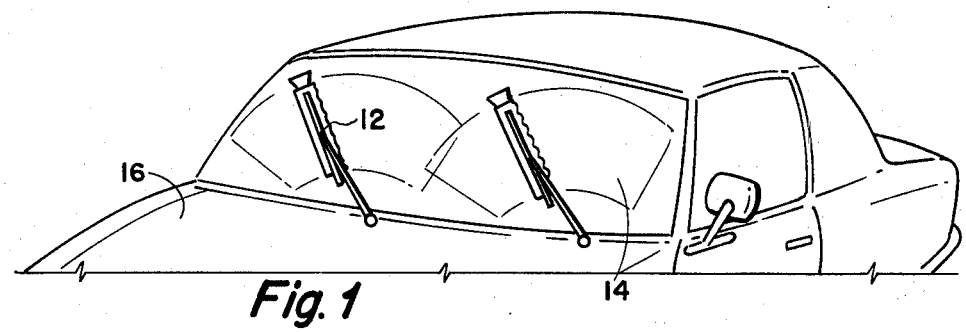
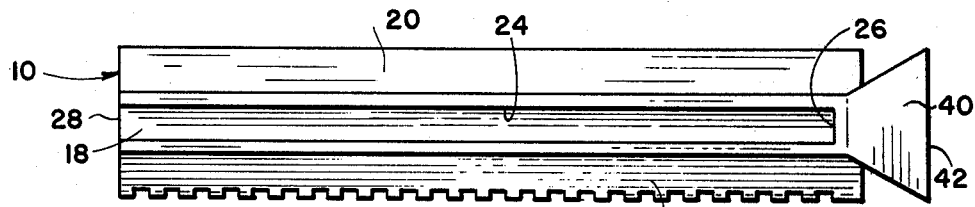
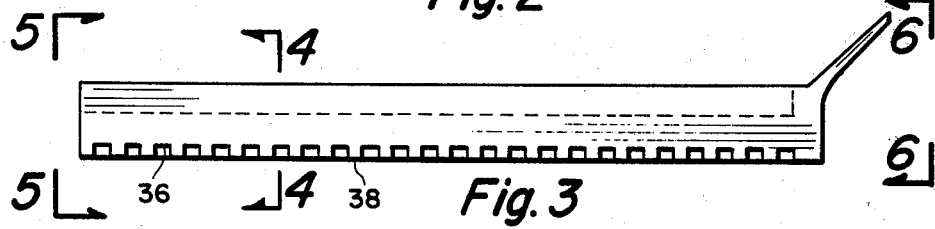
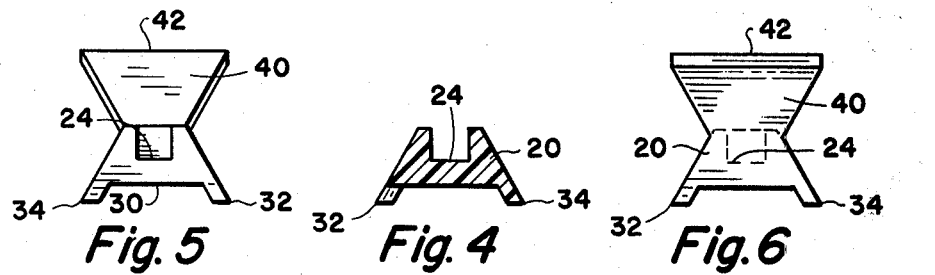
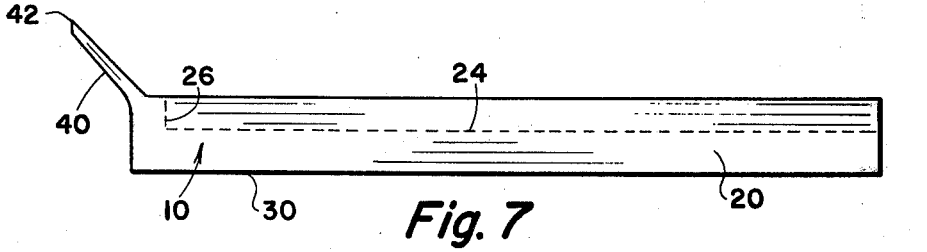

ATTACHMENT FOR WINDSHIELD WIPER BLADES

BACKGROUND OF THE INVENTION

1. Field of the Invention

This invention relates to improvements in windshield wiper blades for vehicles and more particularly, but not by way of limitation, to a scraper blade for removable attachment to the wiper blade.

2. Description of the Prior Art

During inclement weather conditions the driving of a vehicle frequently becomes hazardous for many reasons. For example, snow, ice, or the like, may accumulate on the outer surface of the windshield either during driving of the vehicle or while the vehicle is stored in an exposed location. This condition hinders the driving of the vehicle in that the vision of the driver is impaired by the materials covering the windshield. In order to alleviate this disadvantage, many persons cover the windshield during periods of non-use of the vehicle in order to preclude the adherence of ice and snow and the like, thereto. In addition, it is frequently necessary to scrape any adhered ice from the windshield prior to driving of the vehicle and there are many hand operated scraping devices available for accomplishing this chore. However, when driving during icy or snowy weather conditions, the accumulations of the falling snow, freezing sleet, or the like, is frequently to fast and heavy for removal by the usual windshield wiper blades, thus increasing the hazards of vehicle operation by limiting the visibility of the driver.

SUMMARY OF THE INVENTION

The present invention contemplates a novel windshield wiper blade attachment particularly designed and constructed for overcoming the foregoing disadvantages. The novel blade attachment comprises an elongated body having a slot or recess provided along one side thereof for receiving the usual vehicle wiper blade therein. The opposite side of the body is of cross sectional configuration whereby the oppositely disposed side edges thereof are relatively sharp, providing scraping edges for the attachment. One of the scraping edges may be provided with a plurality of longitudinally spaced recesses or grooves, if desired which form teeth-like elements for engagement with the outer surface of the windshield during operation of the vehicle wiper blade. As the wiper blade moves to and fro over the surface of the windshield in the usual operational manner, the scraping edges of the attachment efficiently wipe any ice, snow, sleet, or the like, from the associated surface of the windshield, thus maintaining a substantial clear path of vision for the driver through the area wiped by the blades. In addition, a scraper element extends transversely across the outer end of the body member which may be utilized manually for an initial scraping of the windshield prior to attaching of the body to the wiper blades, if such initial clearing of the windshield is necessary. The novel wiper blade attachment is simple and efficient in operation and economical and durable in construction.

BRIEF DESCRIPTION OF THE DRAWINGS

FIG. 1 is a perspective view of a portion of a vehicle having wiper blade attachments embodying the invention installed thereon.

FIG. 2 is a plan view of a wiper blade attachment embodying the invention.

FIG. 3 is a side elevational view of a wiper blade attachment embodying the invention.

FIG. 4 is a sectional view taken on line 4—4 of FIG. 3.

FIG. 5 is a view taken on line 5—5 of FIG. 3.

FIG. 6 is a view taken on line 6—6 of FIG. 3.

FIG. 7 is a side elevational view of a wiper blade attachment embodying the invention, and from the opposite side as shown in FIG. 3.

DESCRIPTION OF THE PREFERRED EMBODIMENT

Referring to the drawings in detail, reference character 10 generally indicates an attachment for the usual wiper blade 12 normally utilized in conjunction with the windshield 14 of a vehicle 16. The attachment 10 comprises a body portion 18 of a substantially rectangular overall configuration and having inwardly diverging sidewalls 20 and 22 whereby one of the long sides of the body 18 is of a greater width than the other long side thereof. The narrow long edge of the body 18 is provided with a longitudinally extending slot 24 therein for receiving the wiper blade 12 therein. The slot 24 is preferably closed at one end 26 for receiving the outer end of the wiper balde 12 there against and is preferably open at the opposite end 28 thereof for facilitating insertion of the wiper blade therein in a longitudinal direction. Of course it will be apparent that both ends of the slot 24 may be closed, if desired, whereby the wiper blade 12 may be inserted therein in a transverse direction.

The cross sectional configuration of the wider long edge of the body 18 is recessed as shown at 30, providing a pair of oppositely disposed longitudinally extending relatively sharp scraper edges 32 and 34. It is preferable that at least one of the edges, as for example the edge 32 be provided with a plurality of longitudinally spaced recesses or grooves 36 providing teeth 38 spaced longitudinally along the edge for facilitating a windshield scraping operation.

The closed end 26 of the slot 24 is conterminous with an angularly and outwardly extending substantially wedge shaped flange 40 having the outer edge 42 thereof spaced from the body 20 and extending transversely with respect to the longitudinal axis of the body. The edge 42 is a relatively sharp scraping edge for facilitating manual removal of any ice, snow, or the like, from the outer surface of the windshield prior to engagement of the attachment 10 with the wiper blade 12, as necessary or if desired.

In use, the attachment 10 may be suitably secured to the usual wiper blade 12 by inserting the outer edge portion of the blade 12 into the slot or recess 24. In this manner, the scraping edges 32 and 34 will be disposed adjacent the outer surface of the windshield 14, and as the wiper blades 12 are actuated in the usual to and fro motion therefor, the scraping edges 32 and 24 efficiently wipe or scrape any falling snow, sleet, or the like from the windshield for substantially precluding any accumulation thereof in the area wiped by the blades 12. In this manner a clear field of vision through the windshield is maintained for the driver or operator of the vehicle 16.

In the event there is an accumulation of the ice, snow, or the like, on the outer surface of the windshield prior to the installation of the attachments 10 on the wiper blades, one or both of the attachments devices 10 may be utilized manually in much the same manner as the well known hand-type scraper device whereby the scraping edge 42 may be engaged with the windshield for removal of the material. The attachments 10 may then be installed on the blades 12 as hereinbefore set forth, and during operation of the vehicle 16, any falling or newly accumulating snow, ice or the like, may be wiped away for precluding an accumulation thereof on the windshield.

From the foregoing it will be apparent that the present invention provides a novel attachment for vehicle windshield wiper blades which efficiently maintain a substantially clear field of vision for the driver of the vehicle by a continuous wiping or scraping of the outer surface of the windshield during operation of the wiper blades. The novel attachment may be utilized for clearing a previously coated windshield prior to installation of the attachment on the wiper blades, if desired. In addition, the attachment may be quickly and easily installed on the wiper blades when needed, and readily removed from engagement with the wiper blades when there is no need for the scraping action.

Whereas the present invention has been described in particular relation to the drawings attached hereto, it should be understood that other and further modifications, apart from those shown or suggested herein may be made within the spirit and scope of this invention.

What is claimed is:

1. An attachment for vehicle windshield wiper blades and comprising an elongated body having a slot extending longitudinally along one side thereof for receiving a wiper blade therein, scraper means provided on the opposite side edges of the body and extending longitudinally therealong to provide a scraping of the windshield during operation of the wiper blades, and transversely extending scraper means provided on one end of the body for manual scraping of the windshield for facilitating the scraping action of the longitudinal scraper means, wherein the transverse scraping edge comprises an angularly and outwardly extending flange, and as-craping edge provided at the outer end of the flange extending transversely with respect to the longitudinal axis of the body.

2. An attachment as set forth in claim 1 wherein the slot is provided with one open end for receiving the wiper blade therethrough and one closed end for receiving one end of the wiper blade thereagainst.

3. An attachment as set forth in claim 1 wherein the longitudinally extending scraper means comprises a main body portion having an uninterrupted substantially flat surface oppositely disposed with respect to the slot, a pair of spaced mutually parallel scraping edges extending outwardly along the opposite edges of the flat surface for independent engagement with the outer surface of the windshield during operation of the wiper blades.

4. An attachment as set forth in claim 3 wherein one of the longitudinal scraping edges is provided with a plurality of longitudinally spaced teeth for facilitating the scraping operation.

* * * * *